US012683951B2

(12) United States Patent
Pourzandi et al.

(10) Patent No.: US 12,683,951 B2
(45) Date of Patent: Jul. 14, 2026

(54) PROXY CERTIFICATE MANAGEMENT FOR NFV ENVIRONMENT (PCS)

(71) Applicant: Telefonaktiebolaget LM Ericsson (publ), Stockholm (SE)

(72) Inventors: Makan Pourzandi, Montreal (CA); Bernard Smeets, Dalby (SE); Harri Hakala, Turku (FI); Tommy Arngren, Södra Sunderbyn (SE); Yosr Jarraya, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 117 days.

(21) Appl. No.: 18/567,919

(22) PCT Filed: Jun. 9, 2021

(86) PCT No.: PCT/IB2021/055075
§ 371 (c)(1),
(2) Date: Dec. 7, 2023

(87) PCT Pub. No.: WO2022/259024
PCT Pub. Date: Dec. 15, 2022

(65) Prior Publication Data
US 2024/0275775 A1     Aug. 15, 2024

(51) Int. Cl.
*H04L 9/40* (2022.01)
(52) U.S. Cl.
CPC ................................. *H04L 63/0823* (2013.01)
(58) Field of Classification Search
CPC .................................................... H04L 63/0833
USPC ........................................................ 713/156
See application file for complete search history.

(56) References Cited

U.S. PATENT DOCUMENTS

| | | | | |
|---|---|---|---|---|
| 9,210,051 B2 * | 12/2015 | Kruglick | .............. | G06Q 30/018 |
| 2016/0065567 A1 * | 3/2016 | Aggarwal | .............. | G06F 21/10 |
| | | | | 713/175 |
| 2016/0173287 A1 * | 6/2016 | Bowen | .................... | H04L 9/321 |
| | | | | 713/156 |

(Continued)

FOREIGN PATENT DOCUMENTS

EP          3 107 246 A1    12/2016

OTHER PUBLICATIONS

International Search Report and Written Opinion dated Feb. 16, 2022 issued in PCT Application No. PCT/IB2021/055075 filed Jun. 9, 2021, consisting of 14 pages.

(Continued)

*Primary Examiner* — Anthony D Brown
(74) *Attorney, Agent, or Firm* — Weisberg I.P. Law, P.A.

(57) ABSTRACT

A method, system and nodes are disclosed. According to one or more embodiments, a management node is provided. The management node includes processing circuitry configured to receive an origin certificate for a first service type where the received origin certificate includes a public key and a private key, receive a certificate request for a first instance of the first service type, generate a first proxy certificate based at least on the received origin certificate, and transmit the first proxy certificate and the public key of the received origin certificate to a first virtual network function component where the public key of the received origin certificate is for inclusion to a listing of trusted certificates at the first virtual network function component.

20 Claims, 9 Drawing Sheets

(56) References Cited

U.S. PATENT DOCUMENTS

2021/0306161 A1*  9/2021  Medvinsky ............. E02B 3/122
2023/0007474 A1*  1/2023  Ni ........................ H04L 63/029

OTHER PUBLICATIONS

ETSI GR NFV-SEC 005 V1.1.1 (Jan. 2019) Network Functions Virtualisation (NFV); Trust; Report on Certificate Management, consisting of 38 pages.
ETSI GR NFV-SEC 005 V1.2.1 draft 3 (Mar. 2021) Network Functions Virtualisation (NFV); Trust; Report on Certificate Management, consisting of 52pages.
Network Working Group; Request for Comments: 3820; Category: Standards Track; RFC 3820—Internet X.509 Public Key Infrastructure (PKI) Proxy Certificate Profile; Jun. 2004, consisting of 37 pages.
Nokia Software and SK Telecom Technical Whitepaper; Evaluation of a Service-mesh Based Service Communication Proxy for Future 5G Core Network dated Apr. 13, 2020, consisting of 25 pages.

* cited by examiner

10

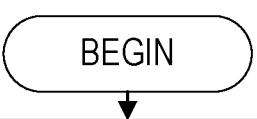

BEGIN

Receive an origin certificate for a first service type where the received origin certificate includes a public key and a private key
S100

Receive a certificate request for a first instance of the first service type
S102

Generate a first proxy certificate based at least on the received origin certificate
S104

Transmit the first proxy certificate and the public key of the received origin certificate to a first virtual network function component where the public key of the received origin certificate is for inclusion to a listing of trusted certificates at the first virtual network function component
S106

END

FIG. 8

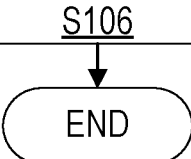

BEGIN

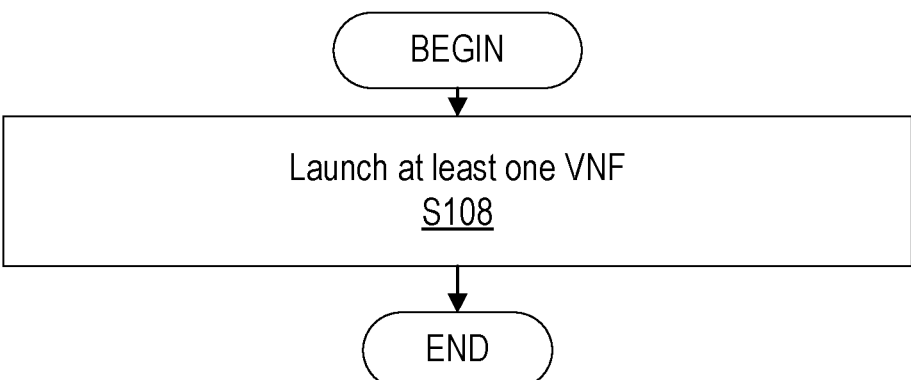

Launch at least one VNF
S108

END

FIG. 9

PROXY CERTIFICATE MANAGEMENT FOR NFV ENVIRONMENT (PCS)

CROSS-REFERENCE TO RELATED APPLICATIONS

This application is a Submission Under 35 U.S.C. § 371 for U.S. National Stage Patent Application of International Application Number: PCT/IB2021/055075, filed Jun. 9, 2021 entitled "PROXY CERTIFICATE MANAGEMENT FOR NFV ENVIRONMENT (PCS)," the entirety of which is incorporated herein by reference.

TECHNICAL FIELD

The present disclosure relates to a network function virtualization (NFV) environment, and in particular, to proxy certificate management and use in the NFV environment.

BACKGROUND

Network Function Virtualization (NFV) enables network device functions to be virtualized so that they do not depend anymore on dedicated hardware and can be deployed in common hardware servers. NFV provides flexibility and dynamicity for the development of new services and allows for automatic deployment, elastic scaling, fault isolation and recovery of network services. Also, Service-based architecture (SBA) provides a modular framework for the development of network functions (NFs), where a given NF is composed of several components, each implementing micro-services exposed and offered on-demand to other components, through a communication protocol over a network.

NFV and SBA are among the two pillars for $3^{rd}$ Generation Partnership Project (3GPP) $5^{th}$ Generation (5G, also referred to as New Radio (NR)) networks. NFV enables the deployment of 5G networks services as interconnected Virtual Network Functions (VNFs), while SBA brings technologies such as micros-service architectures and containers to design and implement VNFs, where each VNF is composed of a set of interacting and communicating virtual network functions components (VNFC). This has many benefits such as scaling in/out the network functions and the network services and the reuse of VNFC.

In the NFV architecture, 5G network nodes may be implemented as VNFs composed of several VNFC implemented each as a container or virtual machine(s). To help fulfill the benefit from virtualization, VNFs and VNFCs from several tenants can be deployed on the same physical host, and thus sharing hardware resources with each other. However, this may bring security risks to the network services due to potential vulnerabilities in virtualization technology and possible isolation breach due to resource sharing. As the interactions and communications between VNFs and between VNFCs may expose sensitive functionalities and information, there is a need to protect such communication channels. Thus, network functions may need to be securely connected and for that purpose 3GPP uses in its SBA architecture Transport Layer Security (TLS) based protection. More precisely, there is a need to provide the necessary security functionalities such as authentication, authorization and encryption between different components of the network service in NFV.

In this context, Public Key Infrastructures (PKI) can help provide such a solution as it enables distributing Public Key Certificates (PKC) NFV for the support of Public Key Cryptography in authenticating, authorizing and encrypting links between objects in NFV. In 5G SBA, certificates are needed between VNFs, but also internally within the network functions between their internal components (VNFC). In this context, to help ensure secure identities and allow secure communication and interaction through authentication and authorization and encryption of communications between different VNFs and VNFCs, each entity (VNF and VNFC) may be issued a certificate that complies with a certificate policy where one can revoke this certificate.

However, in such a dynamic and automated environment, it may be expected that several VNFs and VNFCs are to be created (or cloned) and deleted in real time to address the variation in service demand by scaling in/out the VM or containers. Furthermore, as the number of users/wireless devices of the services increase, and to achieve the level of quality of service and scalability, the certificate management system needs to cope with this increase in size by managing many certificates in real time. This means that there is a need to use many more certificates than 4G and previous networks have used. In particular, 5G networks may require more certificates in a more complex framework than previous networks, e.g., 4G networks. For example, with SBA and slicing, 3GPP NFs and also their internal realizations need certificates and store secrets. Also, because of demand driven dynamic scaling, certificate issuing is not an initial deployment problem, and continuous enrollment may be needed.

ETSI NFV Standardization Related Context

To standardize certificate management in NFV, the European Telecommunication Standards Institute (ETSI) NFV-SEC group describes a certificate management framework in NFV. A set of uses cases for the use of certificates in NFV has been discussed by this group. Therein, a VNF instance composed of various VNFC instances could have multiple logical identities, each of which is represented by a certificate, to communicate with different peers.

When scaling in/out or when using micro services, many containers are created often in a short period of time. According to ETSI NFV standard SEC005, one possible solution is for each container to have its own identity (ID). This could mean creating a certificate for each container launched. There is then a need to provide many certificates in short period of time to different containers created to provide high availability of services. However, existing certificate management is unable to adequately scale to meet the demand of creating many certificates in a short period of time without hindering real time network functionality.

Another use case is when Mobile Network Operator (MNO) provides cloud infrastructure (infra) to a customer. In this case, MNO runs the VNFs for this customer in NFV environment. As explained before, the VNFs would then use the certificates for communications provided by MNO at launch time. However, in this use case, the customer is disadvantageously not able to be on charge of controlling the certificate validity used by MNO to run customer's VNFs.

FIG. 1 is a certificate hierarchy presented by the ETSI NFV-SEC group (i.e., ETSI NFV) as described in, for example, ETSI, Network Functions Virtualisation (SEC005 NFV); Trust; Report on Certificate Management, V1.1.1 (2019-01). In particular, ETSI NFV proposes that one ID have multiple credentials, some of them are unique and some of them are bound to multiple VNFCI as illustrated in the example of FIG. 2 as described in, for example, ETSI, Network Functions Virtualisation (SEC005 NFV); Trust; Report on Certificate Management, V1.1.1 (2019-01).

Further, based on SEC005 NFV, one possible arrangement may involve creating a sub-CA per VNF type. However, this solution does not allow for the tenant to adequately address the life cycle load and complexity problems (e.g., issue and revoke all thousands of certificates in short periods of time).

Further, based on SEC005 NFV, one possible arrangement uses a sub-CA for all VNFs (resp. sub-CA for NFVI) to issue and revoke certificates. The problem with this approach is that the revocation of a sub-CA results in revoking a wide range of certificates issued for different types of VNFC (resp. all containers and infra in NFVI environment). Also, SEC005 NFV, in see 8.1.2.2, does not describe that the VNFM may ask for certificates from the operator CA.

Hence, existing solutions fail to provide low complexity arrangement that is able to scale with the dynamics of a NFV environment in a 5G system.

SUMMARY

Some embodiments advantageously provide methods, systems, and nodes for proxy certificate management and use for an NFV environment.

As discussed above, the use of PKIs with VNFs and VNCs may provide a dynamic and automated environment where several VNFs and VNFCs are to be created (or cloned) and deleted in real time to address the variation in service demand by scaling in/out the VM or containers. However, there is not efficient solution for using PKIs with VNFs and VNCs such that there is a need to provide an efficient certificate management system to issue and revoke the certificates accordingly.

Further, ETSI NFV proposes that one ID have multiple credentials, some of them are unique and some of them are bound to multiple VNFCI as illustrated in FIG. 3. In particular, the same certificate is shared by the various VNFs. In the sub-CA approach, the revocation of a sub-CA results in revoking a wide range of certificates issued for different types of VNFC (resp. all containers and infra in NFVI env.), thereby making scaling at a granular level difficult. One or more embodiments described herein address this issue by providing multiple proxy certificates for the same ID, i.e., VNF type.

One or more embodiments described herein provide a finer grained and flexible approach. For example, in one or more embodiments, revoking the origin certificate (orig-in_cert) for a service type would address the revocation of all thousands of proxy certificates. The origin_cert can still be revoked by the tenant which in turn revokes the validity of all proxy certificates. Further, the one or more embodiments allow for individual proxy certificates to be revoked, thereby allowing for fine grain scaling of, for example, VNFs. Therefore, in one or more embodiments described herein, the tenant still controls the life cycle without assuming its load and complexity. Also, different certificate generation granularity is provided.

Also, SEC005 NFV, in see 8.1.2.2, does not describe that the VNFM may ask for certificates from the operator CA. In particular, the VNFM may generate its own proxy certificates. For this option, the VNFCI generates public-private key pair, and constructs the public key certificate request message. VNFCI sends certificate request message to VNFM, using the initial credential to request a formal certificate issued by Operator CA. And VNFM authenticates the message based on the initial credential, signs the message with the private key corresponding to VNFM certificate. However, having the VNFM generate its own certificates may hinder tenant control of certificates.

In one or more embodiments, a new component Proxy Certificate Generator (PCG) per tenant is provided where the PCG is configured to generate proxy certificates for different VNF instances and VNF components created by NFVI on behalf of the tenant, thereby allowing tenant control of certificates while also reducing the certificate management burden on the subCA. For example, in one or more embodiments, the tenant requests a valid certificate origin_cert signed by a Certification Authority (CA) to each service type run by it. In one or more embodiments, it may be assumed that there is a component Certificate Manager (CertM) receiving this origin_cert from the tenant for the service type A, where the proxy certificates are generated based on the origin_cert.

In one or more embodiments, a new component provides the functionality of managing proxy certificates for usage by different containers. This new component is referred to as the Proxy Certificate Generator (PCG). The PCG stores/issues/revokes/removes proxy certificates based on an origin certificate requested by the tenant from a CA for a VNF of type ServiceA. The PCG then is called by Certificate Manager (CertM) each time a new VNF instance of type ServiceA is created to issue a proxy certificate for this instance. These proxy certificates are then provisioned to different VNF instances. In one or more embodiments, the CertM and PCG may be provided by the same physical and/or logical node.

According to one aspect of the disclosure, a management node is provided. The management node includes processing circuitry configured to: receive an origin certificate for a first service type where the received origin certificate includes a public key and a private key, receive a certificate request for a first instance of the first service type, generate a first proxy certificate based at least on the received origin certificate, and transmit the first proxy certificate and the public key of the received origin certificate to a first virtual network function component where the public key of the received origin certificate is for inclusion to a listing of trusted certificates at the first virtual network function component.

According to one or more embodiments of this aspect, the first proxy certificate is configured for use in establishing encrypted communication with at least one other virtual network function component. According to one or more embodiments of this aspect, the processing circuitry is further configured to: receive a certificate request for a second instance of the first service type, generate a second proxy certificate based at least on the received origin certificate where the second proxy certificate is different from the first proxy certificate, and transmit the second proxy certificate and public key of the received origin certificate to a second virtual network function component to enable encrypted communication between the first virtual network function component and the second virtual network function component. According to one or more embodiments of this aspect, the public key of the received origin certificate is for inclusion to a listing of trusted certificates at the second virtual network function component.

According to one or more embodiments of this aspect, the processing circuitry is further configured to: receive an indication that the received origin certificate has been revoked, and cause removal of the received origin certificate from at least the listing of trusted certificates at the first virtual network function component based at least on the indication. According to one or more embodiments of this aspect, the processing circuitry is configured to receive an indication that the received origin certificate has been revoked where the revocation of the received origin certificate is configured to revoke at least the first proxy certificate that has the received origin certificate as part of its chain of trust. According to one or more embodiments of this aspect, the revocation of the received origin certificate corresponds to discarding any service instances of the first service type.

According to one or more embodiments of this aspect, the received origin certificate is issued by a certification authority. According to one or more embodiments of this aspect, the received origin certificate is not configured for use with any service instance of a service type other than the first service type. According to one or more embodiments of this aspect, the received origin certificate is associated with a plurality of access rights, and the first proxy certificate is associated with a subset of the plurality of access rights.

According to another aspect of the disclosure, a method implemented by a management node is provided. An origin certificate for a first service type is received where the received origin certificate including a public key and a private key. A certificate request for a first instance of the first service type is received. A first proxy certificate is generated based at least on the received origin certificate. The first proxy certificate and the public key of the received origin certificate is transmitted to a first virtual network function component where the public key of the received origin certificate is for inclusion to a listing of trusted certificates at the first virtual network function component.

According to one or more embodiments of this aspect, the first proxy certificate is configured for use in establishing encrypted communication with at least one other virtual network function component. According to one or more embodiments of this aspect, a certificate request for a second instance of the first service type is received. A second proxy certificate is generated based at least on the received origin certificate, the second proxy certificate being different from the first proxy certificate. The second proxy certificate and public key of the received origin certificate is transmitted to a second virtual network function component to enable encrypted communication between the first virtual network function component and the second virtual network function component. According to one or more embodiments of this aspect, the public key of the received origin certificate is for inclusion to a listing of trusted certificates at the second virtual network function component.

According to one or more embodiments of this aspect, an indication that the received origin certificate has been revoked is received. Removal of the received origin certificate from at least the listing of trusted certificates at the first virtual network function component is caused based at least on the indication. According to one or more embodiments of this aspect, an indication that the received origin certificate has been revoked is received where the revocation of the received origin certificate is configured to revoke at least the first proxy certificate that has the received origin certificate as part of its chain of trust. According to one or more embodiments of this aspect, the revocation of the received origin certificate corresponds to discarding any service instances of the first service type.

According to one or more embodiments of this aspect, the received origin certificate is issued by a certification authority. According to one or more embodiments of this aspect, the received origin certificate is not configured for use with any service instance of a service type other than the first service type. According to one or more embodiments of this aspect, the received origin certificate is associated with a plurality of access rights where the first proxy certificate is associated with a subset of the plurality of access rights.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 8 is a flowchart of an example process in a management node according to some embodiments of the present disclosure;

FIG. 9 is a flowchart of an example process in a NFVI according to some embodiments of the present disclosure;

DETAILED DESCRIPTION

Third Generation Partnership Project (3GPP) Standardization Related Context

There is increasing interest around service meshes from Telecom operators. Service Communication Proxy (SCP) is a standardized 3GPP Release 16 (Rel.16) system in 5G Core which provides service-level load distribution, QoS control, resiliency and monitoring functions for all 5G network function (NF) signals. The SCP is a service-mesh based system designed to take control of the service-based interface (SBI), so that NFs may have another option not to communicate directly with each other, and instead communicate via the SCP.

SCP may need to terminate TLS connections from different VNFs. This means that there would be side car containers to terminate TLS connections, or additionally there would be SCP components. In all those cases proxy certificates can be used for TLS connections.

Functionality for a Solution

One problem presented is how to ensure that the certificates used by the orchestrator and infrastructure provider for different VNFs can be controlled by the tenant. One solution is to have the certificates' validity depend on original VM/container certificate validity.

The process of creating, distributing, revoking the certificates is very costly in compute and management efforts. Beyond the simple cost, this complexity could make a real time solution very challenging. One or more embodiments described herein provides for distributing the load to at least one node other than a centralized CA such as to help prevent the CA from becoming overloaded when 1000s of certificates to be managed/initiated to different micro services (e.g., used for scaling out a service at NFV level).

Also, PKI for large scale deployments can become very complex for Telecom network operators. As many complex relations exist between different nodes, vendors, network slices, etc. This can lead to complex topology of relations between these different elements, which takes substantial effort for a Telecom operator to coherently issue and revoke (mainly tackle the certificate life cycle) taking care of all these complex relations. The various existing manual solutions cannot tackle this issue. Hence, there is a need for an automated certificate monitoring and life cycle management for the NFV environment.

Cloud Solutions

In one arrangement, VNFs may be built where the certificates are used for communications between VNFs. The certificates may be issued by Certification Manager (CertM, Cert Manager).

Figure 1:
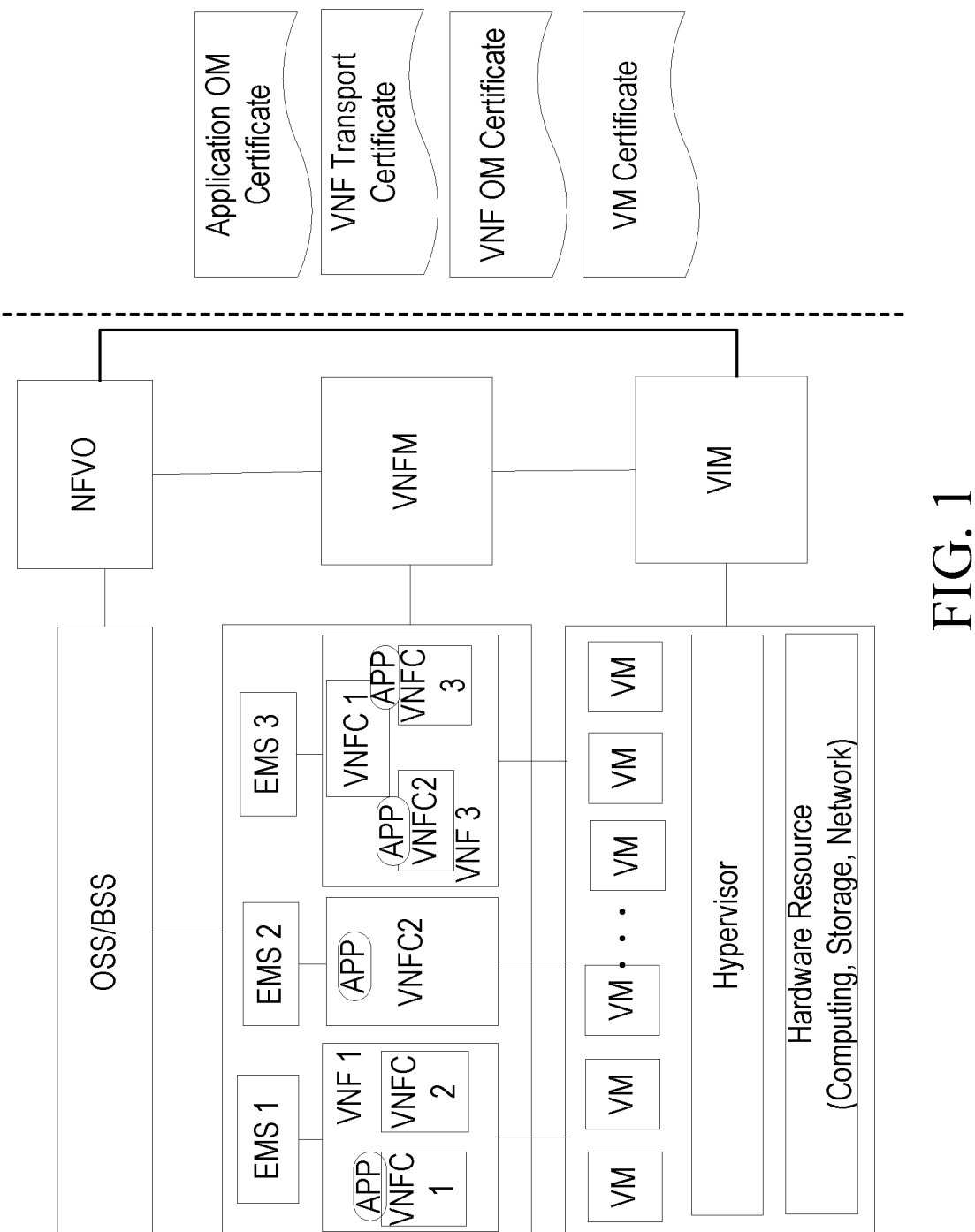
FIG. 1 is a diagram of NFV hierarchy.
Figure 2:
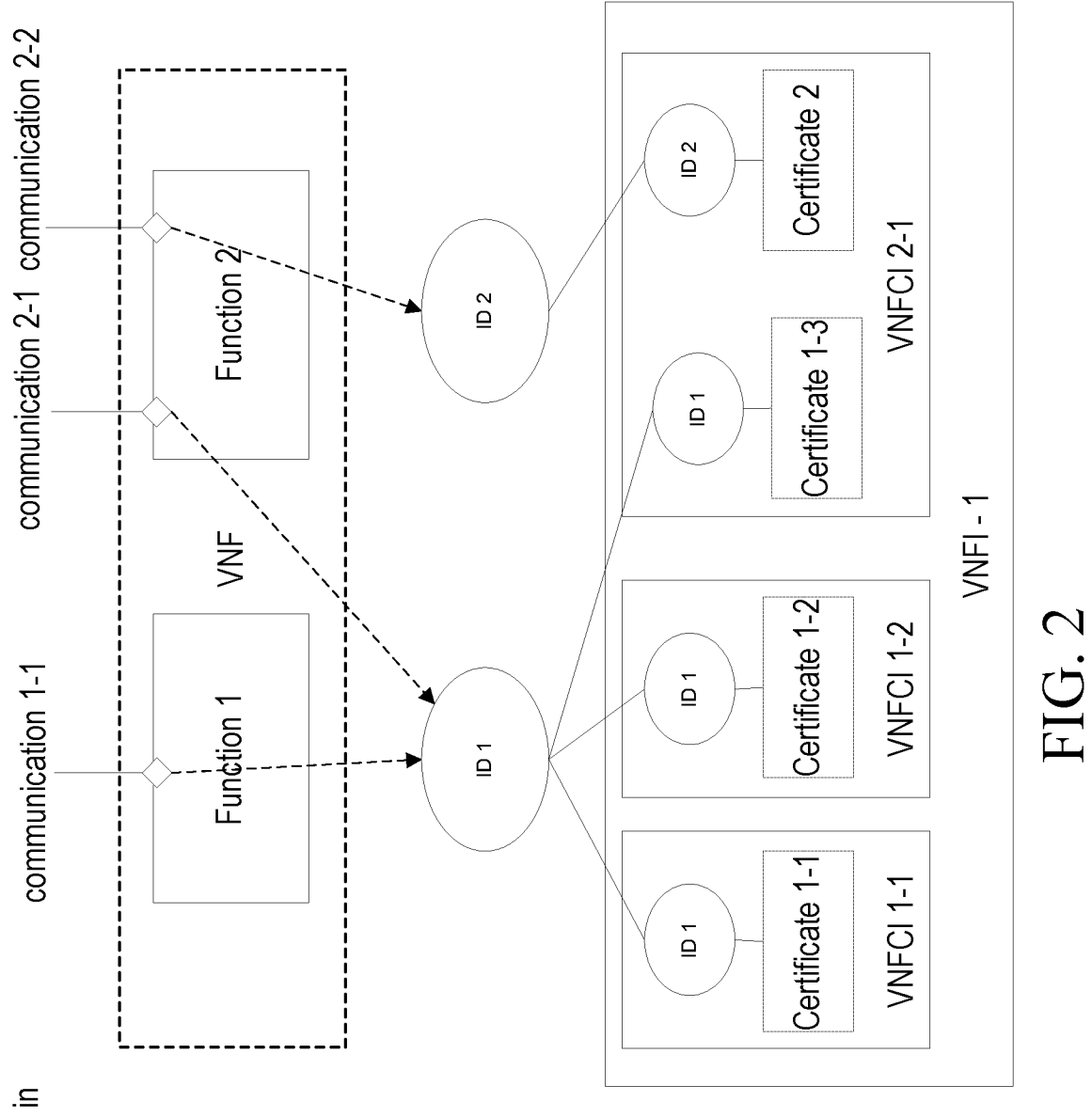
FIG. 2 is a diagram of an example of unique certificate for each VNFCI.
Figure 3:
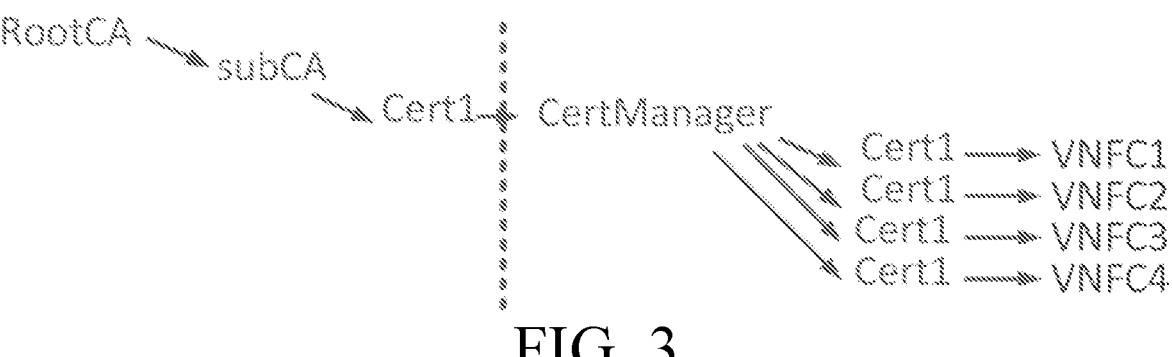
FIG. 3 is a diagram of one example of a solution for scaling VNFCs using a shared certificate.

When the VNFC is instantiated, the VNFC container will ask the subCA (via CertM) for a certificate for its communications between VNFs. This solution works, but the problem is the scaling for VNFCs which now is handled by sharing the same certificate among different VNFCs, as illustrated in the example of FIG. 3. However, such sharing—apart from the security issues—is tricky as it leads to dependencies between the replicas that is undesired.

Figure 4:
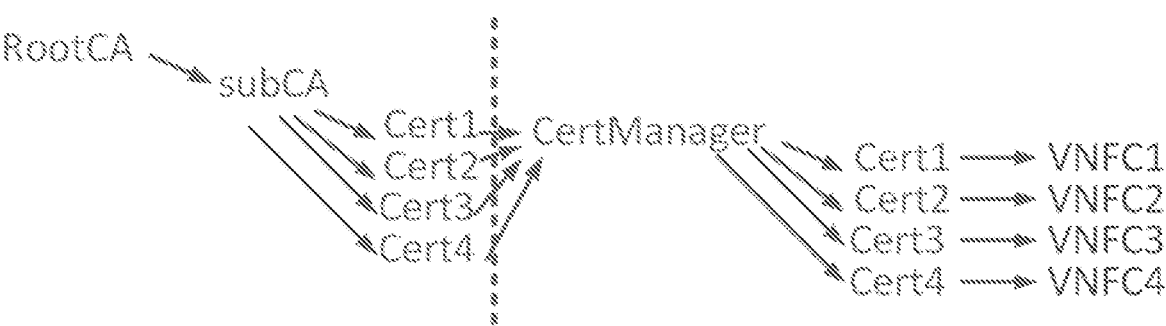
FIG. 4 is a diagram of another example of a solution for a subCA to deliver various certificates for different VNFCs.

Another solution is to ask a SubCA to deliver many certificates for different VNFCs, as illustrated in the example of FIG. 4. Given the high volume of VNFCs created in short period of time in containerized solution, this solution is heavy (e.g., computationally/resource intense) as it necessitates many interactions between SubCA and CertM as well as all end entities must be defined/registered in the subCA via day-0 configurations.

Another solution is to create a new issuing subCA in the Virtualized Infrastructure Management (VIM)/NFVI but this solution is not without issues. If something bad happens or there is an overload/bug in VIM/Network Functions Virtualization Infrastructure (NFVI), that subCA can cause many problems, for example, by missing to revoke the issued certificates.

Figure 5:
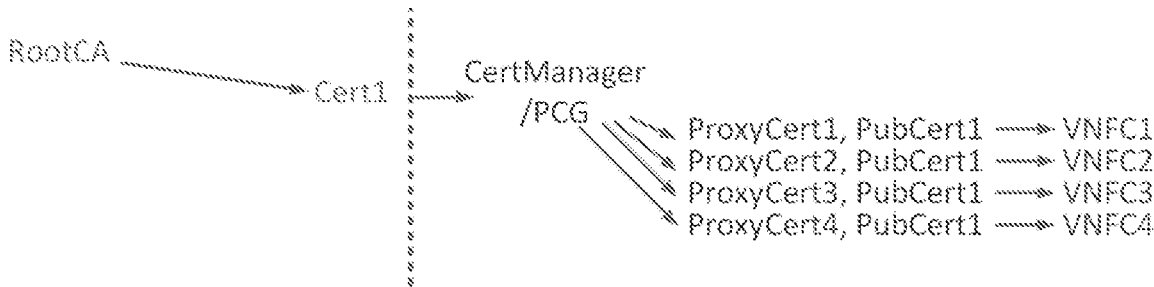
FIG. 5 is a diagram of an example of the implementation of proxy certificates for different VNFCs according to one or more embodiments of the present disclosure.

One or more embodiments described herein solve one or more problems with the above solution at least in part by configuring and using a PCG which may be logically part of or separate from CertM. Therefore, one or more embodiments provides for generating proxy certificates for different VNFCs created to scale out the VNF, as illustrated in the example of FIG. 5 where each VNFC is provided with a different proxy certificate. In this example, VNFC1-VNFC4 are associated with a same service (e.g., ServiceA).

In one or more embodiments, CertM may create a logical PCG per tenant for better functionality and isolation between different tenants. For ease of understanding, the present disclosure describes one or more embodiments with respect to a one tenant scenario although the teachings described herein are applicable to more tenants.

Before describing in detail exemplary embodiments, it is noted that the embodiments reside primarily in combinations of apparatus components and processing steps related to proxy certificate management and use for an NFV environment. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term Proxy Certificate may describe a certificate that is derived from, and signed by, a normal X.509 Public Key End Entity Certificate or by another Proxy Certificate for the purpose of providing restricted proxying and delegation within a PKI based authentication system, as described in RFC3820.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3$^{rd}$ party node, a node external to the current network), nodes in distributed antenna system (DAS), a spectrum access system (SAS)

node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

In one or more embodiments, it may be assumed that a valid certificate origin_cert is assigned to a service type, e.g., ServiceA. It may be assumed that a certificate is built as (PrivCert, PubCert) designating the public key and the private key making the certificate.

In one or more embodiments, it may be assumed that a service of type serviceA is implemented using one or several containers.

In one or more embodiments, it may be assumed that a service of type serviceA is implemented using only one container type, called typeA or a VM type of type A dedicated to this service and running only this service.

In one or more embodiments, it may be assumed that the origin_cert is signed by a Certification Authority (CA).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a management node may be distributed over a plurality of management nodes. In other words, it is contemplated that the functions of the management node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to proxy certificate management and use for an NFV environment. While one or more embodiments are described for containers, the teachings described herein are equally applicable to VMs such as, for example, to VMs where each VM is dedicated to providing only one defined service.

Figure 6:
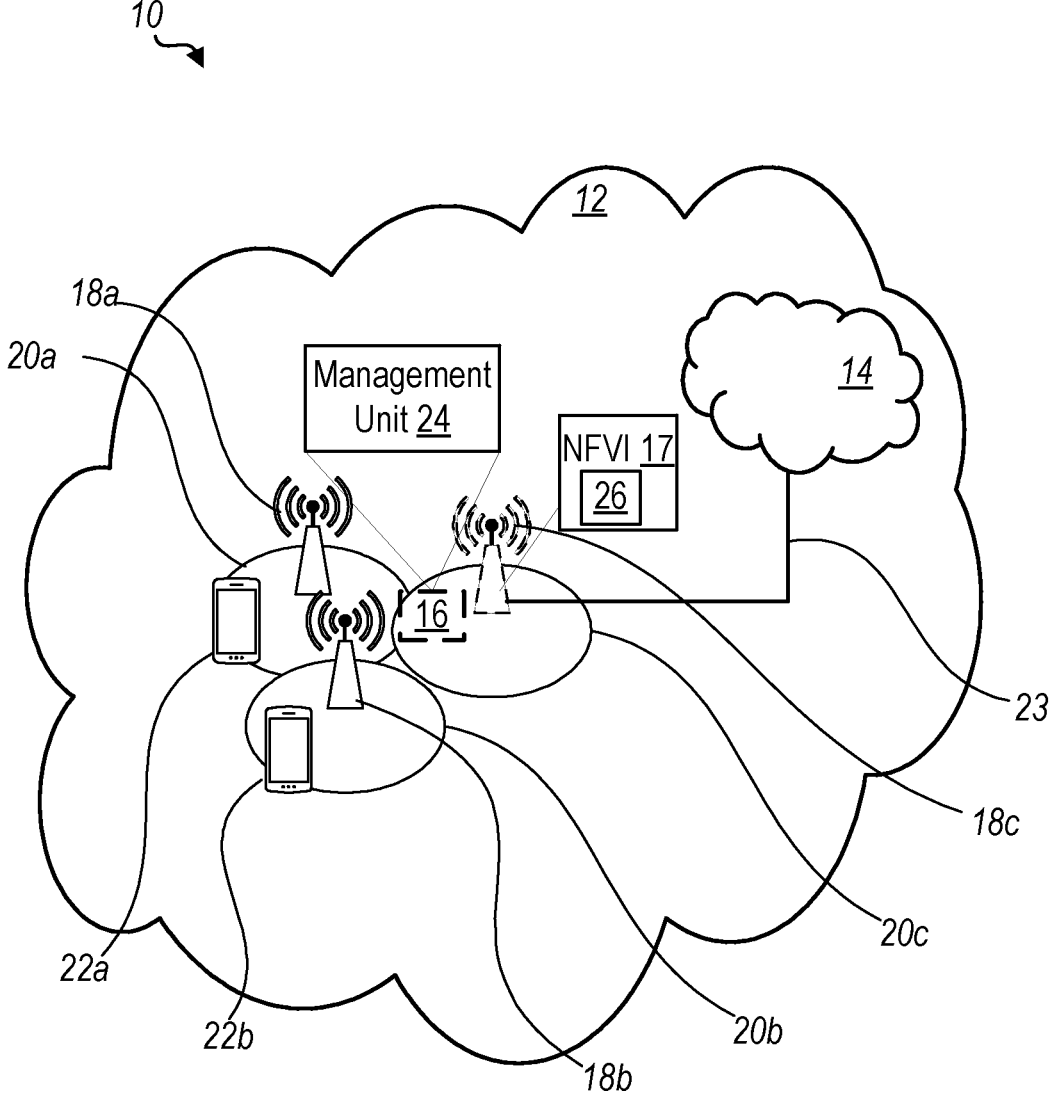
FIG. 6 is a schematic diagram of an example network architecture according to principles disclosed herein.

Referring again the drawing figures, in which like elements are referred to by like reference numerals, there is shown in FIG. 6 a schematic diagram of a communication system 10, according to an embodiment, such as a 3GPP-type cellular network that may support standards such as LTE and/or NR (5G), which comprises an access network 12, such as a radio access network, and a core network 14. System 10 further includes management node 16 that is configured to provide proxy certificate management for an NFV environment, as described herein. System 10 includes network structure virtualization infrastructure (NFVI) 17 for providing one or more functions in a NFV environment such as, for example, launching VNFs and VNFCs to provide one or more network nodes 18.

The access network 12 comprises a plurality of network nodes 18a, 18b, 18c (referred to collectively as network nodes 18), such as NBs, eNBs, gNBs or other types of wireless access points, each defining a corresponding coverage area 20a, 20b, 20c (referred to collectively as coverage areas 20). In one or more embodiments, one or more network nodes 18 are VNFs that use proxy certificates managed by the management node 16.

Each network node 18a, 18b, 18c is connectable to the core network 14 over a wired or wireless connection 23. A first wireless device (WD) 22a located in coverage area 20a is configured to wirelessly connect to, or be paged by, the corresponding network node 18a. A second WD 22b in coverage area 20b is wirelessly connectable to the corresponding network node 18b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 18. Note that although only two WDs 22 and three network nodes 18 are shown for convenience, the communication system may include many more WDs 22 and network nodes 18.

Also, it is contemplated that a WD 22 can be in simultaneous communication and/or configured to separately communicate with more than one network node 18 and more than one type of network node 18. For example, a WD 22 can have dual connectivity with a network node 18 that supports LTE and the same or a different network node 18 that supports NR. As an example, WD 22 can be in communication with an eNB for LTE/E-UTRAN and a gNB for NR/NG-RAN.

Management node 16 is configured to include management unit 24 that is configured to perform one or more management node 16 functions as described herein such as with respect to proxy certificate management for an NFV environment. NFVI 17 is configured to include a VNF unit 26 which is configured to perform one or more NFVI 17 functions as described herein.

Example implementations, in accordance with an embodiment, of the management node 16 and NFVI 17 discussed in the preceding paragraphs will now be described with reference to FIG. 7.

Management node 16 includes hardware 28 enabling it to communicate with NFVI 17 and other entities such as tenant, etc., as described herein. The hardware 28 may include a communication interface 30 for setting up and maintaining at least a connection 23 with a NFVI 17, tenant, etc.

In the embodiment shown, the hardware 28 of the management node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the management node 16 has software 41 stored internally in, for example, memory 40, or stored in external memory (e.g., database, storage array, network storage device, etc.) accessible by management node 16 via an external connection. The software 41 may be executable by the processing circuitry 36. The processing circuitry 36 may be configured to control any of the methods and/or processes described herein and/or to cause such methods, and/or processes to be performed, e.g., by management node 16. Processor 38 corresponds to one or more processors 38 for performing management node 16 functions described herein. The memory 40 is configured to store data, programmatic software code and/or other information described herein. In some embodiments, the software 41 may include instructions that, when executed by the processor 38 and/or processing circuitry 36, causes the processor 38 and/or processing circuitry 36 to perform the processes described herein with respect to management node 16. For example, processing circuitry 36 of management node 16 may include management unit 24 which is configured to perform one or more management node 16 functions as described herein such as with respect to proxy certificate management for an NFV environment.

The communication system 10 includes a NFVI 17. NFVI 17 includes hardware 42 enabling it to communicate with management node 16 and other entities in the NFV environment. For example, the hardware 42 may include a communication interface 44 for communicating with one or more entities such as with management node 16 via connection 23.

In the embodiment shown, the hardware 42 of the NFVI 17 further includes processing circuitry 50. The processing circuitry 50 may include a processor 52 and a memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) the memory 54, which may comprise any kind of volatile and/or nonvolatile memory, e.g., cache and/or buffer memory and/or RAM (Random Access Memory) and/or ROM (Read- Only Memory) and/or optical memory and/or EPROM (Erasable Programmable Read-Only Memory).

Thus, NFVI 17 further has software 56 stored internally in, for example, memory 54, or stored in external memory (e.g., database, storage array, network storage device, etc.) accessible by the NFVI 17 via an external connection. The software 56 may be executable by the processing circuitry 50. The processing circuitry 50 may be configured to control any of the methods and/or processes described herein and/or to cause such methods, and/or processes to be performed, e.g., by NFVI 17. Processor 52 corresponds to one or more processors 52 for performing NFVI 17 functions described herein. The memory 54 is configured to store data, programmatic software code and/or other information described herein. In some embodiments, the software 56 may include instructions that, when executed by the processor 52 and/or processing circuitry 50, causes the processor 52 and/or processing circuitry 50 to perform the processes described herein with respect to NFVI 17. For example, processing circuitry 50 of the NFVI 17 may include VNF unit(s) 26 which are configured to perform one or more NFVI 17 functions as described herein such as with respect to launching VNFs and VNFCs to, for example, provide one or more network nodes 18.

Figure 7:
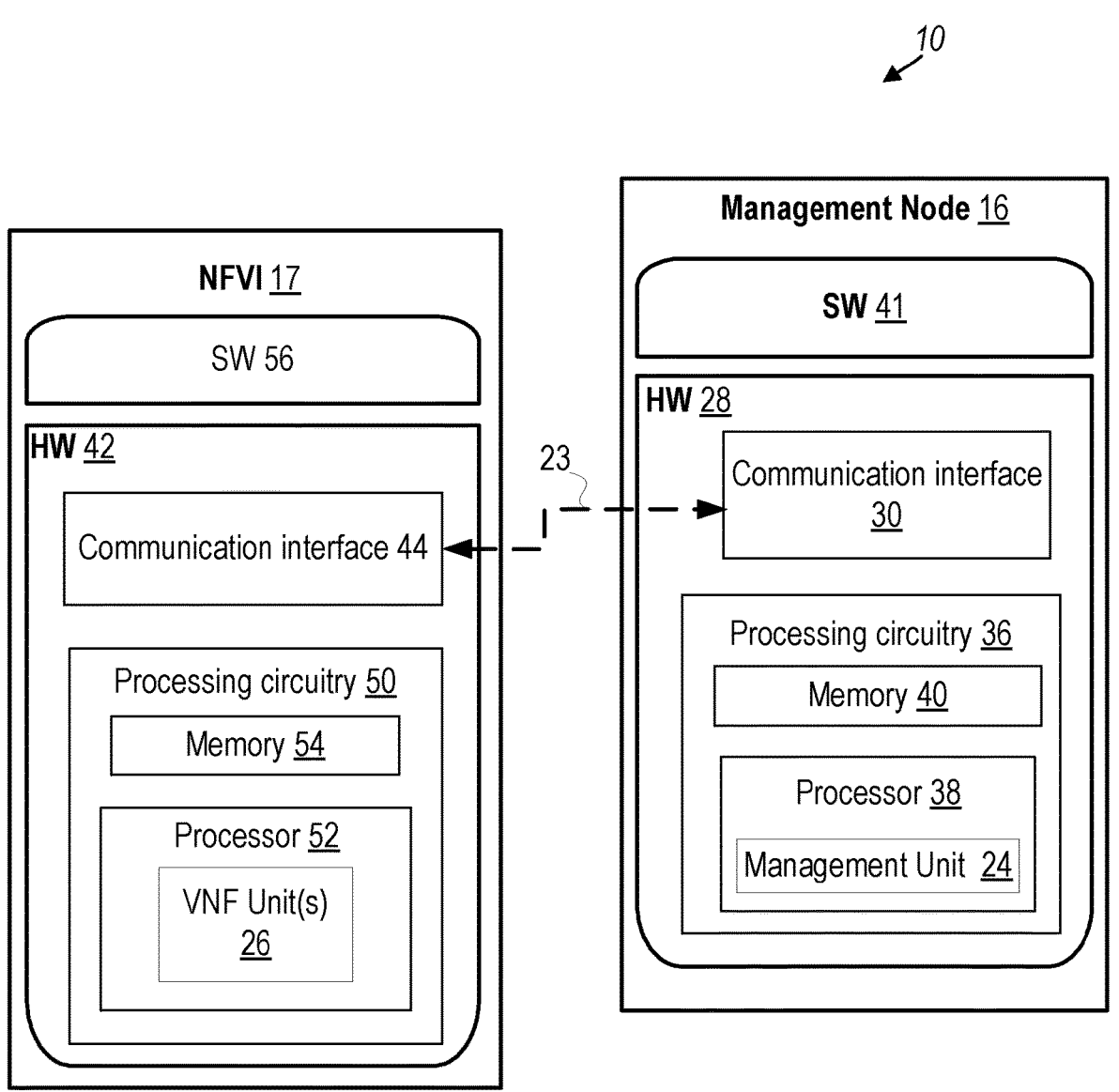
FIG. 7 is a block diagram of a management node in communication with a NFVI according to some embodiments of the present disclosure.

In some embodiments, the inner workings of management node 16 and NFVI 17 may be as shown in FIG. 7 and independently, the surrounding network topology may be that of FIG. 6.

Although FIGS. 6 and 7 show various "units" such as management unit 24 and VNF unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 8 is a flowchart of an example process in a management node in accordance with some embodiments of the present disclosure. One or more blocks described herein may be performed by one or more elements of management node 16 such as by one or more of processing circuitry 36 (including management unit 24), processor 38, and/or communication interface 30. Management node 16 such as via processing circuitry 36 and/or processor 38 and/or communication interface 30 is configured to receive (Block S100) an origin certificate for a first service type, the received origin certificate including a public key and a private key, as described herein. Management node 16 is configured to receive (Block S102) a certificate request for a first instance of the first service type, as described herein. Management node 16 is configured to generate (Block S104) a first proxy certificate based at least on the received origin certificate, as described herein. Management node 16 is configured to transmit (Block S106) the first proxy certificate and the public key of the received origin certificate to a first virtual network function component where the public key of the received origin certificate is for inclusion to a listing of trusted certificates at the first virtual network function component, as described herein.

According to one or more embodiments, the first proxy certificate is configured for use in establishing encrypted communication with at least one other virtual network function component. According to one or more embodiments, the processing circuitry is further configured to: receive a certificate request for a second instance of the first service type, generate a second proxy certificate based at least on the received origin certificate where the second proxy certificate is different from the first proxy certificate, and transmit the second proxy certificate and public key of the received origin certificate to a second virtual network function component to enable encrypted communication between the first virtual network function component and the second virtual network function component. According to one or more embodiments, the public key of the received origin certificate is for inclusion to a listing of trusted certificates at the second virtual network function component.

According to one or more embodiments, the processing circuitry is further configured to: receive an indication that the received origin certificate has been revoked, and cause removal of the received origin certificate from at least the listing of trusted certificates at the first virtual network function component based at least on the indication. According to one or more embodiments, the processing circuitry is configured to receive an indication that the received origin certificate has been revoked, the revocation of the received origin certificate being configured to revoke at least the first proxy certificate that has the received origin certificate as part of its chain of trust. According to one or more embodiments, the revocation of the received origin certificate corresponds to discarding any service instances of the first service type.

According to one or more embodiments, the received origin certificate is issued by a certification authority. According to one or more embodiments, the received origin certificate is not configured for use with any service instance of a service type other than the first service type. According to one or more embodiments, the received origin certificate is associated with a plurality of access rights where the first proxy certificate is associated with a subset of the plurality of access rights.

FIG. 9 is a flowchart of an example process in a NFVI 17 according to some embodiments of the present disclosure. One or more blocks described herein may be performed by one or more elements of NFVI 17 such as by one or more of processing circuitry 50 (including the VNF unit 26), processor 52, and/or radio interface 46. Wireless device 22 such as via processing circuitry 50 and/or processor 52 and/or radio interface 46 is configured to launch (Block S108) at least one VNF (or one or more VNF components). In one or more embodiments, network node 18 may be implemented by a VNF that may be composed of one or more VNFCs.

Having generally described arrangements for proxy certificate management and use for an NFV environment, functions and processes are provided as follows, and which may be implemented by the management node 16 and NFVI 17.

Some embodiments provide proxy certificate management and use for an NFV environment. One or more functions described below may be implemented by management node 16 such as via one or more of communication interface 30, processing circuitry 36, memory 40, processor 38, management unit 24, etc. Further, one or more functions described below may be implemented by NFVI 17 such as via one or more of processing circuitry 50, memory 54, processor 52, VNF unit 26, etc.

One or more embodiments described herein integrates a new component to provide the functionality of managing proxy certificates for usage by different containers. This new component is referred to as the Proxy Certificate Generator (PCG or ProxyCertGen). The PCG stores/issues/revokes/ removes proxy certificates based on an origin certificate provided by the tenant for a VNF of type ServiceA.

One or more embodiments are based on a VNF deployer (herein referred to as the tenant) to provide one certificate per VNF type. Subsequently, this certificate is used by PCG to issue proxy certificates to all instances of VNF instances or VNF Components (VNFC) of that VNF type.

Note that that description herein assumes a service type is provided by only one VNF type and one container type, however the teachings described herein are extendable to multiple VNFs representing a service type. In one or more embodiments, it may be assumed that there is a component Certificate Manager (CertM) receiving this origin_cert from the tenant for the service type A.

One or more embodiments may assume that CertM is in charge of managing and controlling origin_cert for a VNF type serviceA. CertM uses PCG to store and retrieve this origin_cert for any instance of VNF type serviceA.

Note that CertM can contain a logical component PCG for the efficiency purposes. However, to ease understanding of PCG functionality, CertM and PCG are treated below as separate logical and/or physical entities.

The role of proxy certificate issuer (and the proxy certificate revocation) may be assigned to PCG. This means that PCG could issue (or revoke) proxy certificate(s) from a valid certificate. Note, PCG may perform this features at run-time locally without involving the main certificate authority (CA) for the operator. This has therefore the advantage of not overloading the operator CA with many proxy issues for containers (particularly valuable in a micro service setup when many micro services are created in short period of time).

For each new VNF instance or VNFC launched, a proxy certificate is created from origin_cert by, for example, PCG. VNFC may have different ways to be provided with proxy certificate at launch time such as, for example:

At the launch time, NFVI may request the proxy certificate from CertM and provision VNFC with that certificate.

VNFC may request the proxy certificate directly from PCG or CertM using a secure authenticated connection.

For simplicity, the case of VNFCs in the following are considered where it may be assumed that the VNFCs request the proxy certificates from CertM using a secure connection.

For the proxy certificates to be validated for establishing a TLS connection, the public key from origin_cert is sent to different VNFCs.

1. After issuing proxy certificates from origin_cert, PCG pushes origin_cert's public key, PubOrigin_Cert with the proxy certificates to the VNFCs.

2. All VNFCs must accept PubOrigin_Cert as a trusted certificate. By trusted certificate, it is meant that the certificate may now be part of the trusted chain in certification validity verification.

3. VNFCs should be guaranteed to receive revocations from SubCA.

The TLS implemented for different VNFCs may then use the origin_cert as part of their trust chain validation. This would result in establishing TLS connections between VNFs.

The revocation for all the proxy certificates is performed by the subCA in that as soon as the subCA revokes the origin_certificate, all the chains of trust having origin_cert as part of it would be revoked and therefore all proxy certificates will be revoked as well.

Therefore, PCG shares the load of managing certificates (e.g., issuing new certificates) when dealing with micro services type architecture for different VNFCs.

When the serviceA is deprecated and the original certificate (i.e., origin_cert) is then deprecated by CA. CA is on charge of issuing CRL request to invalidate origin_cert. Further, as the origin_cert is provided by the tenant where the tenant is provided with the opportunity of revoking the origin_cert independently from CertM and PCG, therefore revoking all the proxy certificates issued by them. This approach provides the tenant with the possibility of outsourcing the certificate issuance costs to PCG while keeping the control of revoking all instances of certificates issued by PCG. Further, as origin_cert is invalidated (i.e., revoked), all proxy certificates issued from origin_cert are also automatically invalidated without any additional effort based at least on the origin_cert being in path validation and as one certificate in the path validation is invalid, the entire path is invalid and then the proxy certificate becomes invalid.

PCS Certificate Creation/Assignment and Usage for Containers

Figure 10:
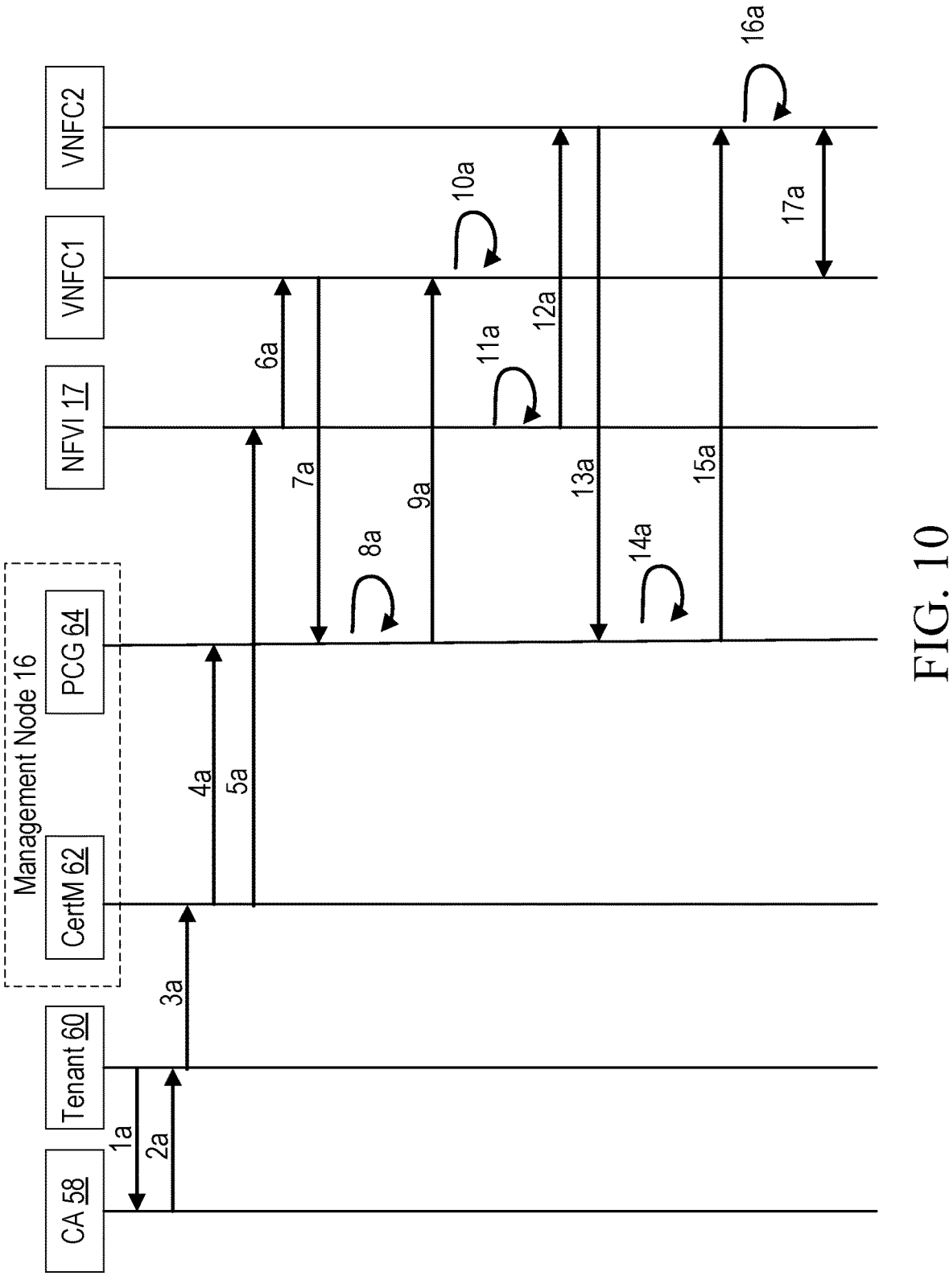
FIG. 10 is a signaling diagram for instating VNFCs provisioned with proxy certificates according to some embodiments of the present disclosure.

An example of the functionality for creating, assigning and using proxy certificates for different VNF components (VNFC) is described below. FIG. 10 is an example signaling diagram representing PCS according to one or more embodiments of the present disclosure. Different steps related to instantiating VNFCs provisioned with proxy certificates are enumerated below:

1a. Request Cert for ServiceA. The tenant 60 generates the secrets that need the certificate, and then registers at the CA 58. The tenant 60 then fetches/retrieves the certificate by certificate sign request, which is the only process shown in FIG. 10 for step 1 for simplicity of explanation and understanding.

2a. Origin_Cert, ServiceA. The CA 58 creates a certificate, i.e., Origin_cert and returns it to the tenant 60.

3a. Origin_Cert, Service A. The tenant 60 uses this certificate, origin_cert, and provides it to CertM 62 for the service type A.

4a. Add(Origin_Cert, ServiceA). CertM 62 sends the origin_cert to the component ProxyCert Generator 64 (also referred to as PCG 64 and ProxyCertGen 64) to store and manage the life cycle of the proxy certificates created for the VNFCs of service type A.

5a. Create VNF(ServiceA). At a later time such as when, for example, the tenant 60 triggers to start a service instance of type A, VIM/NFVI 17 starts the instance of service A.

6a. Launch VNFC. VIM/NFVI 17 instantiates new instance of VNFC, VNFC1.

7a. RequestCert(ServiceA). The VNFC1 instance requests PCG 64 to provide it with a proxy certificate for service type A. The details of how VNFC1 is authenticated by PCG 64 are out of the scope of the present disclosure. However, one possible implementation provides that a password or nonce is provided to VNFC1 which may be used later to authenticate to PCG 64 to receive proxy certificates for service type A. Note that this is an example method, and many other ways are possible to perform this.

8a. Proxy_Origin_Cert1=Generate(Origin_Cert). ProxyCertGen 64 finds the origin_Cert corresponding to service type A, checks the origin_Cert validity and then generates new proxy certificates, i.e., proxy_origin_cert1 is generated.

9a. Proxy_Origin_Cert1, PubCertOrigin_cert. The proxy_origin_cert1 and public key of origin_Cert (i.e., PubCertOrigin) are returned to VNFC1.

10a. PubCertOrigin_cert is added to trusted certificates. VNFC1 accepts PubOrigin_Cert as a trusted certificate and add it to its list of trusted certificates.

11a. Scale out ServiceA. VIM/NFVI 17 determines to scale up the service type A.

12a. Launch VNFC. NFVI 17 launches VNFC2.

13a. RequestCert(ServiceA). VNFC2 requests a proxy certificate to PCG 64 for the service A.

14a. Proxy_Origin_Cert2=Generate(Origin_Cert). PCG 64 creates a new proxy certificate (i.e., proxy_orgin_cert2) for VNFC2.

15a. Proxy_Origin_Cert2, PubCertOrigin_Cert. The proxy_origin_cert2 and public key of origin_Cert (i.e., PubCertOrigin) are provisioned to VNFC2.

16a. PubCertOrigin_cert is added to trusted certificates. VNFC2 accepts PubOrigin_Cert as a trusted certificate and add it to its list of trusted certificates.

17a. Establish secure communications. The proxy_origin_cert1 and proxy_origin_cert1 are used to establish secure communications (and possibly authentication and/or access control) between different VNFCs such as, for example, between VNFC1 and VNFC2.

PCS Certificate Revocation

Figure 11:
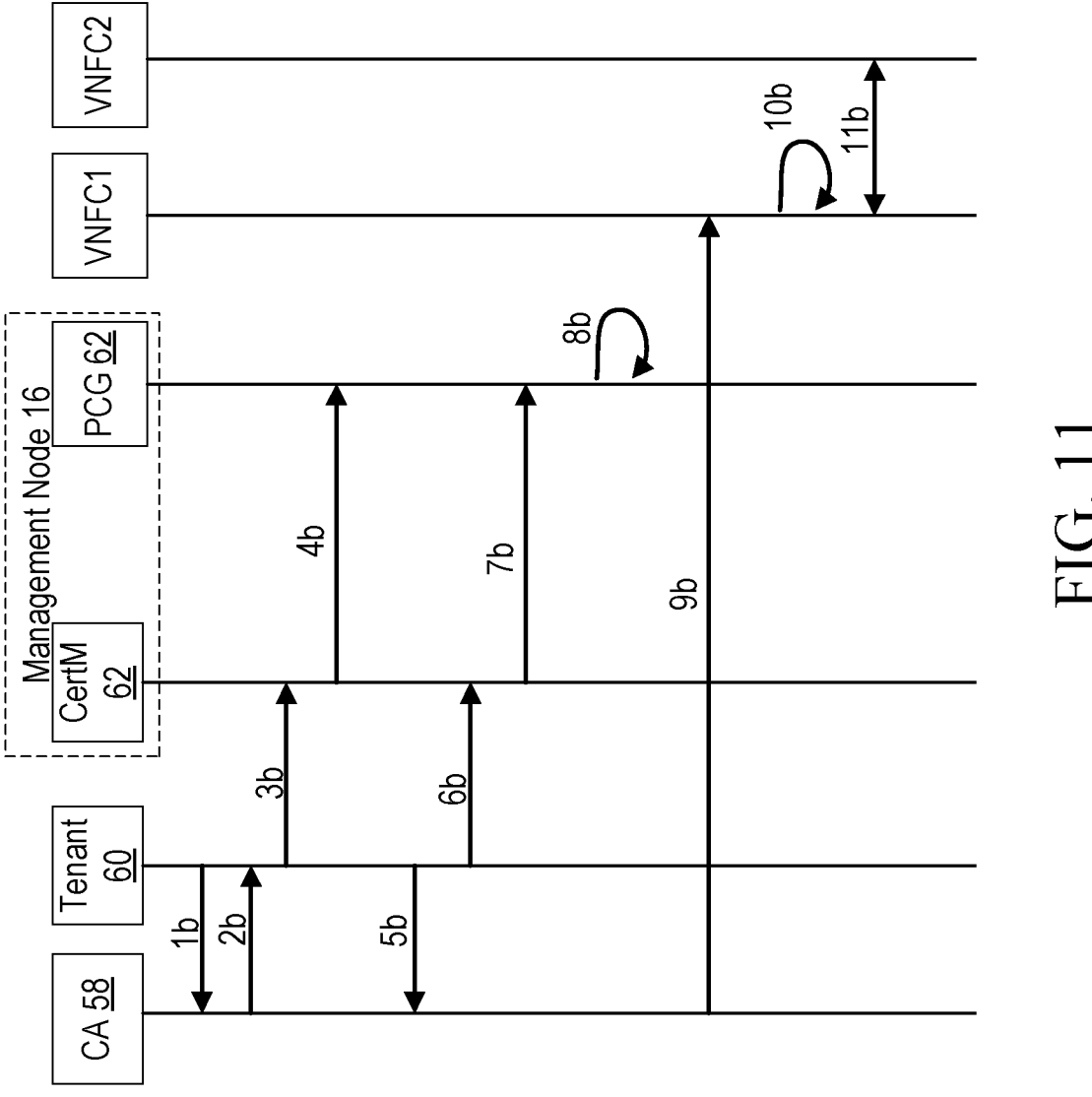
FIG. 11 is a signaling diagram for proxy certificate revocation according to some embodiments of the present disclosure.

In the following, an example of the functionality for revoking proxy certificates for different VNF components (VNFC) is described with respect to FIG. 11. Different steps are enumerated below:

1b. Send Cert Sign request for ServiceA. The tenant 60 generates the secrets (e.g., service) that wants/needs the certificate, and registers at the CA 58. The tenant fetches the certificate by certificate sign request, where only this fetching action is illustrated in FIG. 11 for simplicity.

2b. Origin_Cert, Service A. The CA 58 creates a certificate, i.e., Origin_cert, and provides it to the tenant 60.

3b. Origin_Cert, ServiceA. The tenant 60 uses this certificate, origin_cert, and provides it to CertM 62 for the service type A.

4b. Add(Origin_Cert, ServiceA). CertM 62 sends the origin_cert to the component ProxyCert Generator 64 to store and manage the life cycle of the proxy certificates created for the VNFCs of service type A.

Revocation of Proxy Certificates for Service Type A

5b. Request Revocation for Origin_Cert. The tenant 60 determines to discard the service type A. Therefore, the tenant 60 determines to revoke origin_cert certificate associated to the service type A.

6b. Origin_Cert Revoked. The tenant 60 informs CertM and removes the images and certificates from CertM 62. The description herein focuses on revocation of origin_cert for service A.

7b. Remove(Origin_Cert, ServiceA) The CertM 62 informs PCG 64 to remove the origin_cert.

8b. Delete(Origin_Cert, ServiceA). The ProxyCertGen 64 component removes origin_Cert associated with service type A.

9b. Revocation_Origin_Cert. The origin_cert revocation is diffused by CA 58 to different VNFCs.

10b. Remove origin_cert from the list of trusted certificates. As the user application is informed about the revocation of origin_cert revocation, origin_cert certificate is removed from the trusted list of certificates.

11b. No more secure communications. When VNFC2 tries to establish a secure communication with the user application, the secure communication establishment fails as the proxy certificates are not valid anymore.

PCS Certificate Creation/Assignment and Usage for Containers Through NFVI (Alternate Example)

This is an alternate example for the "PCS certificate creation/assignment and usage for containers" section for certificate manager usage. In one or more embodiments, the proxy certificate request and transmission are performed to/from NFVI 17 toward VNFCs.

Figure 12:
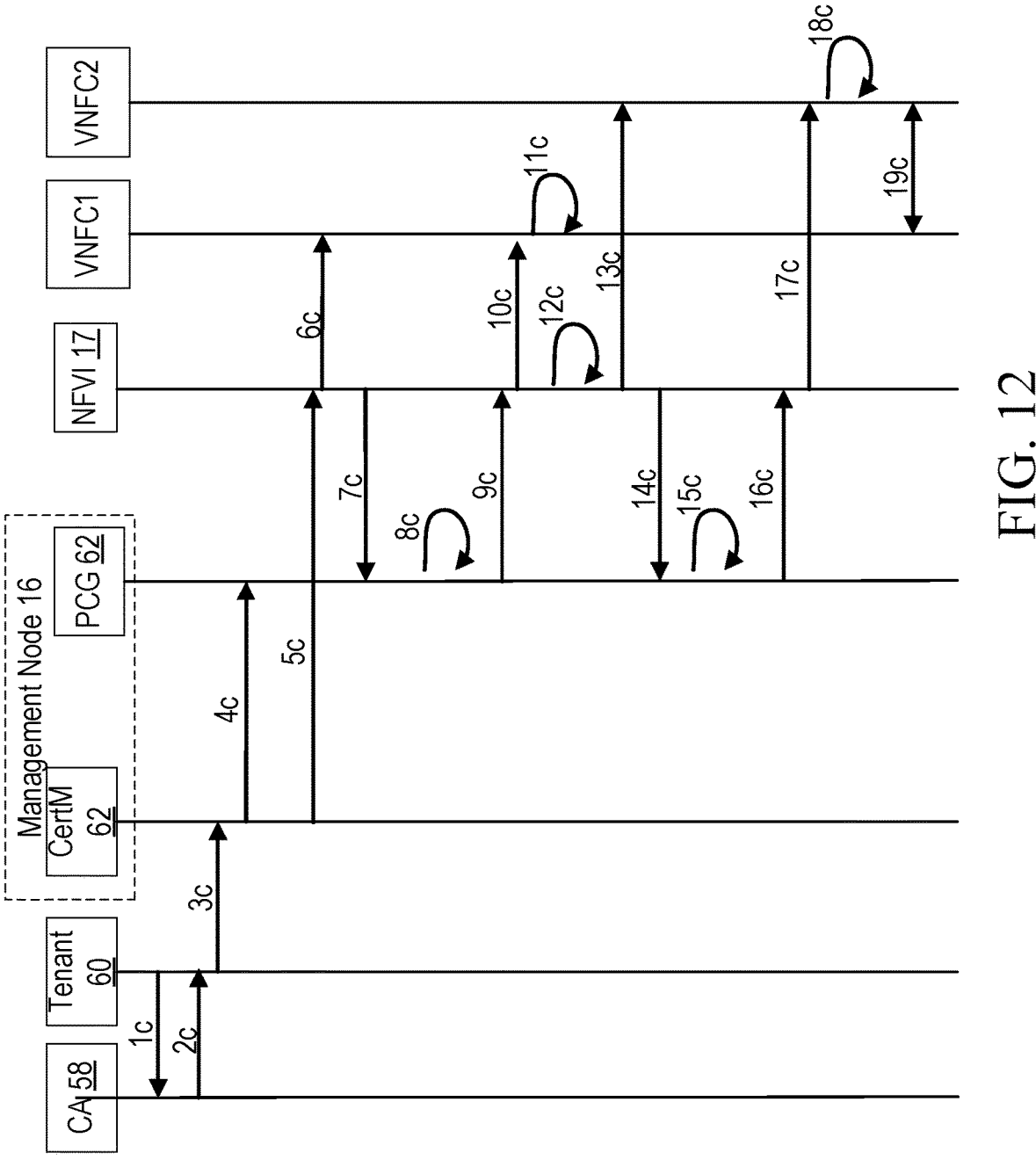
FIG. 12 is a signaling diagram for certificate creation/assignment and usage for containers through NFVI according to some embodiments of the disclosure.

Instantiating VNFCs Provisioned with Proxy Certificates— FIG. 12.

1c. Request Cert for ServiceA. The tenant 60 generates the secrets (e.g., services) that want the certificate, and then registers at the CA 58. The tenant 60 fetches the certificate by a certificate sign request where only the request process is shown in FIG. 12 for simplicity.

2c. Origin_Cert, ServiceA. The CA 58 creates a certificate, i.e., Origin_cert, and provides it to the tenant 60.

3c. Origin_Cert, ServiceA. The tenant 60 uses this certificate, origin_cert, and provides it to CertM 62 for the service type A.

4c. Add(Origin_Cert, ServiceA). CertM 62 sends the origin_cert to the component ProxyCert Generator 64 to store and manage the life cycle of the proxy certificates created for the VNFCs of service type A.

5c. CreateVNF(ServiceA). At a later time such as, for example, at a time when the tenant triggers to start a service instance of type A, VIM/NFVI 17 starts the instance of service A.

6c. Launch VNFC. VIM/NFVI 17 instantiates new instance of VNFC, VNFC1.

7c. RequestCert(ServiceA). NFVI 17 requests PCG 64 to provide it with a proxy certificate for service type A.

8c. Proxy_Origin_Cert1=Generate(Origin_Cert). ProxyCertGen 64 finds the origin_Cert corresponding to service type A, (checks its validity) and then generates new proxy certificates, proxy_origin_cert1 is generated.

9c. Proxy_Origin_Cert1, PubCertOrigin_cert. The proxy_origin_cert1 and public key of origin_Cert (i.e., PubCertOrigin) are returned to NFVI 17.

10c. Proxy_Origin_Cert1, PubCertOrigin_cert. NFVI 17 uses ProxyCert1 and PubOrigin_Cert to provision VNFC1.

11c. PubCertOrigin_cert is added to trusted certificates. VNFC1 accepts PubOrigin_Cert as a trusted certificate and add it to its list of trusted certificates.

12c. Scale out ServiceA. VIM/NFVI 17 determines to scale up the service type A.

13c. Launch VNFC. NFVI 17 launches VNFC2.

14c. RequesttCert(ServiceA). NFVI 17 requests a proxy certificate to PCG 64 for the service A.

15c. Proxy_Origin_Cert2=Generate(Origin_Cert). PCG 64 creates a new proxy certificate for VNFC2.

16c. Proxy_Origin Cert2, PubCertOrigin_Cert. The proxy_origin_cert2 and public key of origin_Cert (i.e., PubCertOrigin) are sent to NFVI 17.

17c. Proxy_Origin_Cert2, PubCertOrigin_Cert. NFVI 17 uses ProxyCert2 and PubOrigin_Cert to provision VNFC2.

18c. PubCertOrigin_cert is added to trusted certificates. VNFC2 accepts PubOrigin_Cert as a trusted certificate and add it to its list of trusted certificates.

19c. Establish secure communications. The proxy_origin_cert1 and proxy_origin_cert2 are used to establish secure communications (and possibly authentication and/or access control) between different VNFCs such as between VNFC1 and VNFC2.

Certificate Proxy Generation Granularity

The use of certificate proxies as described herein can be used to address different use cases needing different granularity. Some such use cases are provided below:

Inter and Intra NFV interactions: For the future 5G scenarios as defined before TLS could be used for the communications between VNFC and management or users as well as for communications between different VNFC. Note than different proxy certificates can be used for inter VNF (VNFC<->users) and intra VNF (between VNFC). The use of different proxy certificates may be useful when ramping down VNF service: first one could revoke inter VNF then intra VNF. This way when the inter cluster is revoked, the VNFCs can still communicate to each other to ramp down their activities.

Dual mode approach with (5G) Evolved Packet Core (EPC) and 5G Core (5GC) functionalities. In this scenario, TLS is used for protecting and authenticating NFs external communications between 5G NFs or between 5G NFs and "Service Communication Proxy (SCP). TLS may be required also internally within a NF, e.g., dual mode Packed Core Controller (PCC) implementing the MME, SGW-C (e.g., Serving Gateway-Control Plane), PGW-C (PDN Gateway-Control Plane), AMF (e.g., Access and Mobility Management Function) and SMF (e.g., Session Management Function) control plane network functions to protect communication between internal network functions. One can use different proxy certificates for inter NFs communication (between 5G NFs) and intra NF communications between MME, SGW-C PGW-C, AMF and SMF.

Proxy Certificate Usage by ProxyCertGen 64

This section describes how ProxyCertGen 64 builds different proxies based on tenants needs and security context.

The proxy certificates can be used to delegate the permissions from origin certificate to the proxy certificates or could define a set of restricted access rights compared to the origin_cert associated with proxy certificates, i.e., the proxy certificate may be associated with a subset of a plurality of access rights that are associated with the origin_cert. This can be performed, for example, by using an extension in proxy cert definition as defined in RFC 3820 called proxy policy (which is mandatory for proxy certificates).

In the general use case, the tenant may use one certificate for a service type A (as the tenant 60 could use the same certificate for different services running for the tenant 60), but the tenant 60 may not want to use a set of certificates for different components making the service type A (e.g., for different services ran for the tenant 60). The tenant 60 may prefer to enforce a fine-grained access control inside NFVI 17 by assigning different access rights to different component types part of the same service.

The tenant 60 could define different access rights for different software (SW) component types part of the same virtual app, for example, some SW component type could only have net access (to handle packets), but without any storage access rights (no need to save information to the storage). At the same time, some SW component types may have both net and storage access rights (DBs). In this case, different access rights could be defined in TOSCA (e.g., Topology and Orchestration Specification for Cloud Applications) config file representation by the tenant 60 for a service type. This would mean associating different access rights to different VNFCs (ex: VNFC1: net access, VNFC2: net+storage access).

The configuration of access rights may be enforced by proxyCertGen 64 when building proxy certificates for different VNFCs. At launching different VNFC types, when proxyCertGen 64 receives different VNFC type, the proxyCertGen 64 would consult the associated rights and associate different types (e.g., from TOSCA file) and inserts the corresponding access rights policy in the proxy policy attribute for the proxy certificates (proxy certs). This can be implemented by using the proxy policy attribute in ProxyCertInfo Extension that is described in rfc3820. For the access rights to be enforced by the services in the VIM, this means that the services which receive the proxy cert from a VNFC, they would verify the proxy policy before acceding to the request. In the example above, this means that when the storage service establishes the connection to VNFC, without the access rights to the virtual storage, it simply drops the connection or sends the appropriate error message (e.g., not authorized access)

PCG 64 Deployment

One difference between a Sub-CA and PCG 64 is that, while Sub-CA can issue arbitrary certificates and further delegate signing itself, the PCG 64 cannot perform such functions. The PCG 64 generates proxy certificates from origin_cert for a set of specified entities and the delegated capabilities apply only in one or more specific scenario such that PCG 64 has limited functionality compared to a Sub-CA, but this limited functionality as described herein advantageously provides an arrangement for off-loading certificate management from the CA and/or Sub-CA by use of proxy certificates. Furthermore, PCG 64 can be identified by a public key certificate rather than a certification authority.

In particular, a ProxyManager (e.g., management node 16) may manage the lifecycle of PCG 64 components. Once ProxyManager receives a request with origin_cert, a service type A and a tenant identifier, the ProxyManager verifies whether a PCG 64 is already created for this tenant. If not, the ProxyManager creates a new P PCG 64 associated with the tenant ID and service type A and returns, to the tenant, identification about the created PCG 64. The tenant then communicates securely with the PCG 64 according to the specification in RFC 3820, in order to set up the PCG 64 that can generate Proxy Certificates from an origin certificate. Finally, once this is performed, the tenant 60 informs the VIM through the VNFM about the configured PCG 64 so that it will be used once a network service is created with this service type.

Therefore, one or more embodiments described herein provide a different approach (e.g., an opposite approach in some cases) to the existing manual certificate management for NFV applications in that the embodiments described herein provide for automated certificate monitoring and life cycle management for NFV environment.

One or more embodiments described herein allows for the issuance/revocation of proxy certificates for the VNF component instances by VIM. The validity of these proxy certificates is controlled by one certificate (i.e., origin cert) issued and revoked by a CA based on the requests from the tenant/customer.

One or more embodiments provide PCG 64 inside Management and Orchestration (MANO) VIM to provide the functionality of managing proxy certificates for usage by different containers. A new component PCG 64 in VIM is provided where the PCG 64 stores/issues/revokes/removes proxy certificates based on an origin certificate provided by the tenant for a VNF based on service type.

The PCS decreases the effort to manage the life cycles for various certificates by CA 58 as various proxy certificates can be automatically invalidated by invalidating the origin certificate for a service type such that there is no need for CA 58 to manage life cycles for thousands of proxy certificates to be used for microservices.

In addition, one or more embodiments described herein avoids the need of sharing of certificate credentials among the replicas of a VNFC during scaling out.

One or more of the followings are provided by one or more embodiments described herein:

The certificate issuing task for different VNF components (e.g., microservices) is delegated/outsourced from the external CA 58 to the certificate manager/PCG 64 by issuing proxy certificates. Therefore, as the certificate manager is controlled by the tenant 60, additionally it could run inside the cloud provider infra in an adhoc manner for different virtual applications making the certificate issuance closer to VNFCs and by consequence more efficient. It may be more difficult to run CA 58 in the cloud in adhoc manners as the CA 58 is third party and its infra by definition may have to be run in highly secure environment.

Further, there may be a need for the CA 58 to issue many certificates in a very short period of time (e.g., microservices in cloud native approach). However, this could become very costly (in the resource sense) for CA 58 as issuing certificates is resource intensive. Therefore, the availability of CA 58 can become a bottleneck when there is need to create many certificates in a short period of time to launch many microservices. PCG 64 addresses this problem by issuing and managing the proxy certificates.

PCG 64 decreases the effort to manage the life cycles for many certificates by CA 58. As many proxy certificates can be automatically invalidated by invalidating the origin certificate for a service type, there is no need for CA 58 to manage life cycles for thousands of certificates to be used for microservices.

One or more embodiments described herein reduces the load of CA 58 to issue certificates in short period of time to many containers as this function is performed by PCG 64.

One or more embodiments described herein reduces the complexity of removing the issued certificates (and avoid the risk of use of invalid certificates). For example, as soon as the origin_cert certificate is revoked, all proxy certificates would be automatically revoked, without the need for CA 58 to issue certificate revocation demands for all already issued certificates for VNF instances.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A management node, comprising:
processing circuitry configured to:
   receive an origin certificate that is signed by a Certification Authority and associated with a virtual network function deployer, the received origin certificate being for a first service type provided by the virtual network function deployer and being associated with a public key and a private key;
   receive a certificate request for a first instance of the first service type;
   generate a first proxy certificate derived from the received origin certificate where the received origin certificate is part of the first proxy certificate's chain of trust; and
   cause transmission of the first proxy certificate and the public key of the received origin certificate to a first virtual network function component, the public key of the received origin certificate being for inclusion to a listing of trusted certificates at the first virtual network function component.

2. The management node of claim 1, wherein the first proxy certificate is configured for use in establishing encrypted communication with at least one other virtual network function component.

3. The management node of claim 1, wherein the processing circuitry is further configured to:
   receive a certificate request for a second instance of the first service type;
   generate a second proxy certificate derived from the received origin certificate where the received origin certificate is part of the second proxy certificate's chain of trust, the second proxy certificate being different from the first proxy certificate; and
   cause transmission of the second proxy certificate and public key of the received origin certificate to a second virtual network function component to enable encrypted communication between the first virtual network function component and the second virtual network function component.

4. The management node of claim 1, wherein the public key of the received origin certificate is for inclusion to a listing of trusted certificates at the second virtual network function component.

5. The management node of claim 1, wherein the processing circuitry is further configured to:
   receive an indication that the received origin certificate has been revoked; and
   cause removal of the received origin certificate from at least the listing of trusted certificates at the first virtual network function component based at least on the indication.

6. The management node of claim 1, wherein the processing circuitry is configured to receive an indication that the received origin certificate has been revoked, the revocation of the received origin certificate being configured to revoke at least the first proxy certificate that has the received origin certificate as part of its chain of trust.

7. The management node of claim 5, wherein the revocation of the received origin certificate corresponds to discarding any service instances of the first service type.

8. The management node of claim 1, wherein the received origin certificate is issued by the Certification Authority.

9. The management node of claim 1, wherein the received origin certificate is not configured for use with any service instance of a service type other than the first service type.

10. The management node of claim 1, wherein the received origin certificate is associated with a plurality of access rights; and the first proxy certificate being associated with a subset of the plurality of access rights.

11. A method implemented by a management node, the method comprising:

receiving an origin certificate that is signed by a Certification Authority and associated with a virtual network function deployer, the received origin certificate being for a first service type provided by the virtual network function deployer and being associated with a public key and a private key;

receiving a certificate request for a first instance of the first service type;

generating a first proxy certificate derived from the received origin certificate where the received origin certificate is part of the first proxy certificate's chain of trust; and transmitting the first proxy certificate and the public key of the received origin certificate to a first virtual network function component, the public key of the received origin certificate being for inclusion to a listing of trusted certificates at the first virtual network function component.

12. The method of claim 11, wherein the first proxy certificate is configured for use in establishing encrypted communication with at least one other virtual network function component.

13. The method of claim 11, further comprising:

receiving a certificate request for a second instance of the first service type;

generating a second proxy certificate derived from the received origin certificate where the received origin certificate is part of the second proxy certificate's chain of trust, the second proxy certificate being different from the first proxy certificate; and transmitting the second proxy certificate and public key of the received origin certificate to a second virtual network function component to enable encrypted communication between the first virtual network function component and the second virtual network function component.

14. The method of claim 11, wherein the public key of the received origin certificate is for inclusion to a listing of trusted certificates at the second virtual network function component.

15. The method of claim 11, further comprising:

receiving an indication that the received origin certificate has been revoked; and causing removal of the received origin certificate from at least the listing of trusted certificates at the first virtual network function component based at least on the indication.

16. The method of claim 11, further comprising receiving an indication that the received origin certificate has been revoked, the revocation of the received origin certificate being configured to revoke at least the first proxy certificate that has the received origin certificate as part of its chain of trust.

17. The method of claim 15, wherein the revocation of the received origin certificate corresponds to discarding any service instances of the first service type.

18. The method of claim 11, wherein the received origin certificate is issued by the Certification Authority.

19. The method of claim 11, wherein the received origin certificate is not configured for use with any service instance of a service type other than the first service type.

20. The method of claim 11, wherein the received origin certificate is associated with a plurality of access rights; and the first proxy certificate being associated with a subset of the plurality of access rights.

* * * * *